US008229452B2

(12) United States Patent
Li et al.

(10) Patent No.: US 8,229,452 B2
(45) Date of Patent: *Jul. 24, 2012

(54) DOWNLINK CHANNEL PARAMETERS DETERMINATION FOR A MULTIPLE-INPUT-MULTIPLE-OUTPUT (MIMO) SYSTEM

(76) Inventors: Qinghua Li, Sunnyvale, CA (US); Xintian E. Lin, Mountain View, CA (US); Guangjie Li, Beijing (CN); Kuilin Clark Chen, Beijing (CN); Xiaoyun May Wu, Shanghai (CN)

( * ) Notice: Subject to any disclaimer, the term of this patent is extended or adjusted under 35 U.S.C. 154(b) by 28 days.

This patent is subject to a terminal disclaimer.

(21) Appl. No.: 12/882,957

(22) Filed: Sep. 15, 2010

(65) Prior Publication Data

US 2011/0002372 A1  Jan. 6, 2011

Related U.S. Application Data

(63) Continuation of application No. 11/617,313, filed on Dec. 28, 2006, now Pat. No. 7,818,013.

(60) Provisional application No. 60/797,042, filed on May 1, 2006, provisional application No. 60/784,418, filed on Mar. 20, 2006.

(51) Int. Cl.
*H04W 72/00* (2009.01)
(52) U.S. Cl. ............... 455/452.2; 455/450; 455/451; 455/452.1; 370/310; 370/322; 370/338; 370/339; 370/341
(58) Field of Classification Search ............ 455/450, 455/451, 452.1–452.2, 562.1; 370/310, 322, 370/329, 338–339, 341
See application file for complete search history.

(56) References Cited

U.S. PATENT DOCUMENTS

| 7,295,538 | B2 * | 11/2007 | Aizawa et al. ............ 370/332 |
| 7,428,268 | B2 | 9/2008 | Shen et al. |
| 2006/0039328 | A1 * | 2/2006 | Ihm et al. .................. 370/334 |
| 2008/0119213 | A1 | 5/2008 | Ihm et al. |

FOREIGN PATENT DOCUMENTS

WO  WO02/078211 A2  10/2002

OTHER PUBLICATIONS

Martin Haardt et al., "Smart antennas for wireless communications beyond the third generation," Computer Communications, vol. 26, Issue 1, Jan. 1, 2003, pp. 41-45.

Vishakan Ponnampalam et al., "MIMO Processing for HSDPA in UTRA TDD," Personal, Indoor and Mobile Radio Communications, 2004, PIMRC 2004, 15th IEEE International Symposium on Sep. 5-8, 2004, vol. 4, pp. 2333-2336.

Antti Tolli et al., "Compensation of interference non-reciprocity in adaptive TDD MIMO-OFDM systems," Personal, Indoor and Mobile Radio Communications, 2004, PIMRC 2004, 15th IEEE International Symposium on Sep. 5-8, 2004, vol. 2, pp. 859-863.

Office Action issued Aug. 12, 2011 in Japanese Application No. 2009-510012.

(Continued)

*Primary Examiner* — Wayne Cai
(74) *Attorney, Agent, or Firm* — Schwabe, Williamson & Wyatt, P.C.

(57) ABSTRACT

Embodiments of methods and apparatus for providing downlink channel parameters determination for downlink channels associated with a multiple-input-multiple-output (MIMO) system are generally described herein. Other embodiments may be described and claimed.

16 Claims, 7 Drawing Sheets

OTHER PUBLICATIONS

Office Action issued Jan. 18, 2012 in Chinese Application No. 2007-80015620.0.

Hochwald et al., "Adapting a Downlink Array from Uplink Measurements," IEEE Transactions on Signal Processing, vol. 49, No. 3, Mar. 2001, pp. 642-653.

Chaliste et al., "Uplink to Downlink Spatial Coverage Martix Transformation Concepts for Downlink Beamforming," University Duisburg-Essen, Department of Communication Systems, Duisburg, Germany, pp. 568-571.

Hata et al., "Experimental Evaluation on E-SDM with Channel Estimation Error Compensation," The Institute of Electronics Information and Communication Engineers, IEICE Technical Report, RCS2005-38 (Jun. 2005), Graduate School of Information Science and Technology, Hokkaido University, Sapporo, Japan, pp. 1-7.

* cited by examiner

US 8,229,452 B2

DOWNLINK CHANNEL PARAMETERS DETERMINATION FOR A MULTIPLE-INPUT-MULTIPLE-OUTPUT (MIMO) SYSTEM

CROSS REFERENCE TO RELATED APPLICATIONS

The present application claims priority to U.S. patent application Ser. No. 11/617,313, filed Dec. 28, 2006, entitled "Downlink Channel Parameters Determination For A Multiple-Input-Multiple-Output (MIMO) System," which claims priority to U.S. Patent Application No. 60/797,042, filed May 1, 2006, entitled "Methods and Apparatus for Providing A Power Loading and Modulation Selection System Associated with A Multiple-Input-Multiple-Output (MIMO) System," and to U.S. Patent Application No. 60/784,418, filed Mar. 20, 2006, entitled "System, Apparatus, Associated Methods and Protocols to Support Next Generation Wireless Communications," the entire disclosures of which are hereby incorporated by reference in their entireties for all purposes, except for those sections, if any, that are inconsistent with this specification.

TECHNICAL FIELD

The present disclosure relates generally to wireless communication systems, and more particularly, to methods and apparatus for providing downlink channel parameters, such as bit or power loading and modulation or coding scheme selection for downlink channels in a multiple-input-multiple-output system.

BACKGROUND

As wireless communication becomes more and more popular at offices, homes, schools, etc., different wireless technologies and applications may work in tandem to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, co-existence among these networks may provide a more robust environment with anytime and anywhere connectivity.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide power loading and modulation selection systems and methods for a multiple-input-multiple-output (MIMO) system.

Figure 1:
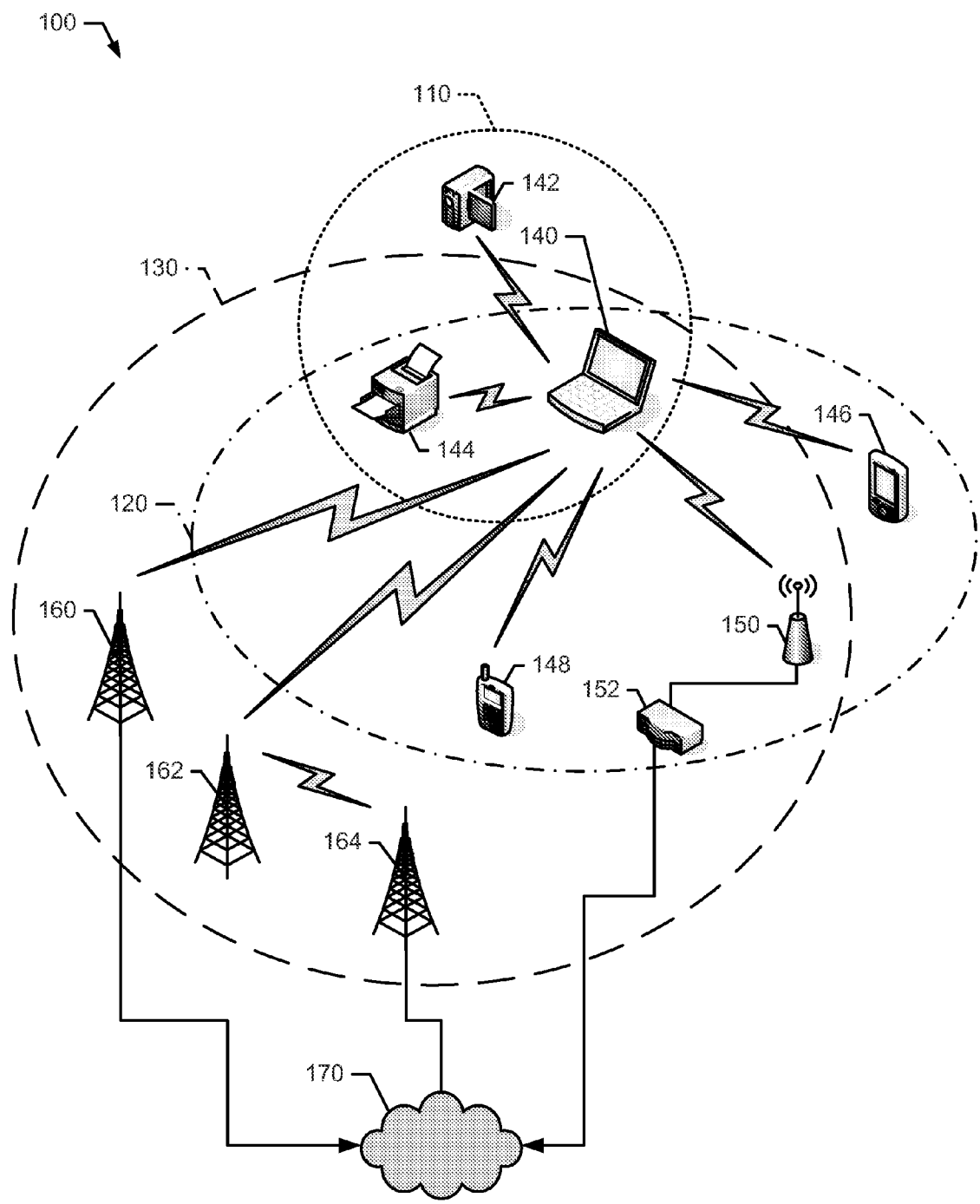
FIG. 1 is a schematic diagram representation of an example wireless communication system according to an embodiment of the methods and apparatus disclosed herein.

Referring to FIG. 1, an example wireless communication system 100, in accordance with various embodiments of the present invention, may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
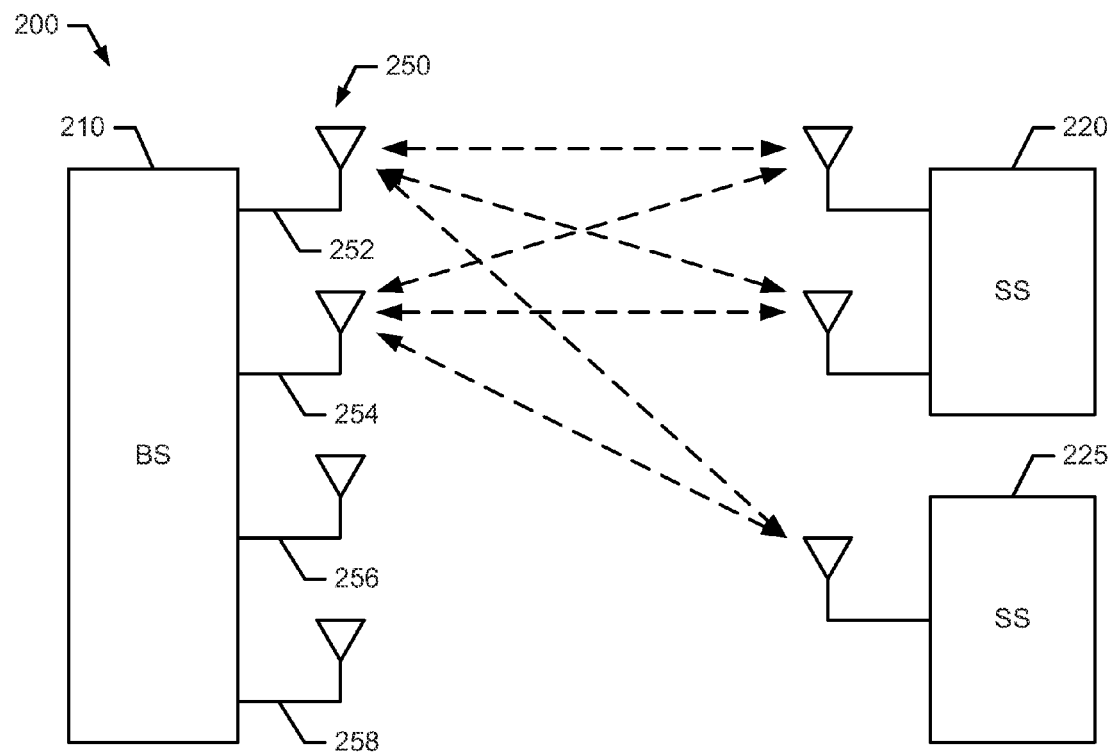
FIG. 2 is a block diagram representation of an example multiple-input-multiple-output (MIMO) system of the example wireless communication system of FIG. 1.

Referring to FIG. 2, an example wireless MIMO system 200, in accordance with various embodiments of the present invention, may include a base station 210 and one or more subscriber stations, generally shown as 220 and 225. The wireless MIMO system 200 may include a point-to-point MIMO system and/or a point-to-multiple point MIMO system. For example, a point-to-point MIMO system may include the base station 210 and the subscriber station 220. A point-to-multiple point MIMO system may include the base station 210 and the subscriber station 225. The base station 210 may transmit data streams to the subscriber stations 220, 225 simultaneously. For example, the base station 310 may transmit two data streams to the subscriber station 220 and one data stream to the subscriber station 225. Although FIG. 2 may depict one subscriber station, the wireless MIMO system 200 may include additional subscriber stations.

The base station 210 may transmit two or more data streams over four transmit antennas 250, generally shown as 252, 254, 256, and 258. Although FIG. 2 depicts four transmit antennas, the base station 210 may include additional or fewer transmit antennas. The methods and apparatus described herein are not limited in this regard.

Figure 3:
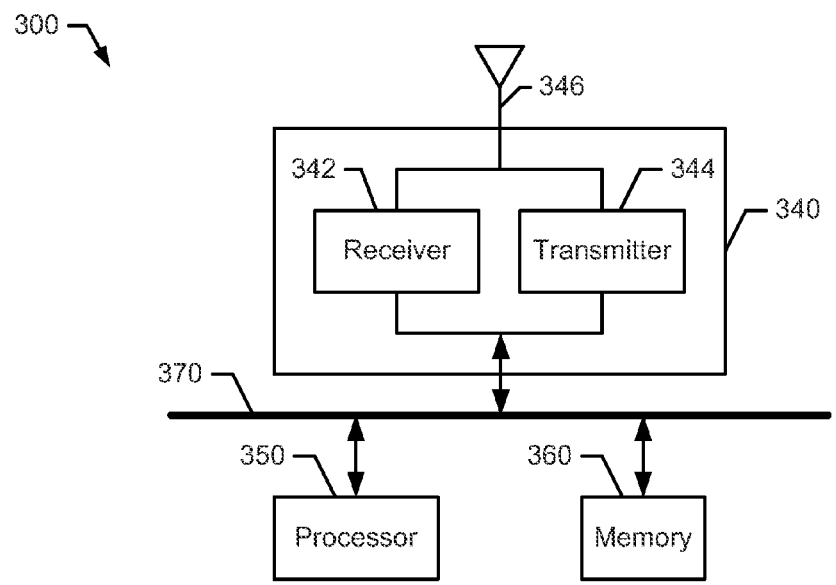
FIG. 3 is a block diagram representation of an example base station of the example MIMO system of FIG. 2.

In the example of FIG. 3, the base station 300 may include a network interface device (NID) 340, a processor 350, and a memory 360. The NID 340, the processor 350, and the memory 360 may be operatively coupled to each other via a bus 370. While FIG. 3 depicts components of the base station 300 coupling to each other via the bus 370, these components may be operatively coupled to each other via other suitable direct or indirect connections (e.g., a point-to-point connection or a point-to-multiple point connection).

The NID 340 may include a receiver 342, a transmitter 344, and an antenna 346. The base station 300 may receive and/or transmit data via the receiver 342 and the transmitter 344, respectively. The antenna 346 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the base station 300 may include additional antennas. For example, the base station 300 may include a plurality of antennas to implement a multiple-input-multiple-output (MIMO) system.

Although the components shown in FIG. 3 are depicted as separate blocks within the base station 300, the functions performed by some of these blocks may be integrated within a single semiconductor circuit or may be implemented using two or more separate integrated circuits. For example, although the receiver 342 and the transmitter 344 are depicted as separate blocks within the NID 340, the receiver 342 may be integrated into the transmitter 344 (e.g., a transceiver). The methods and apparatus described herein are not limited in this regard.

Figure 4:
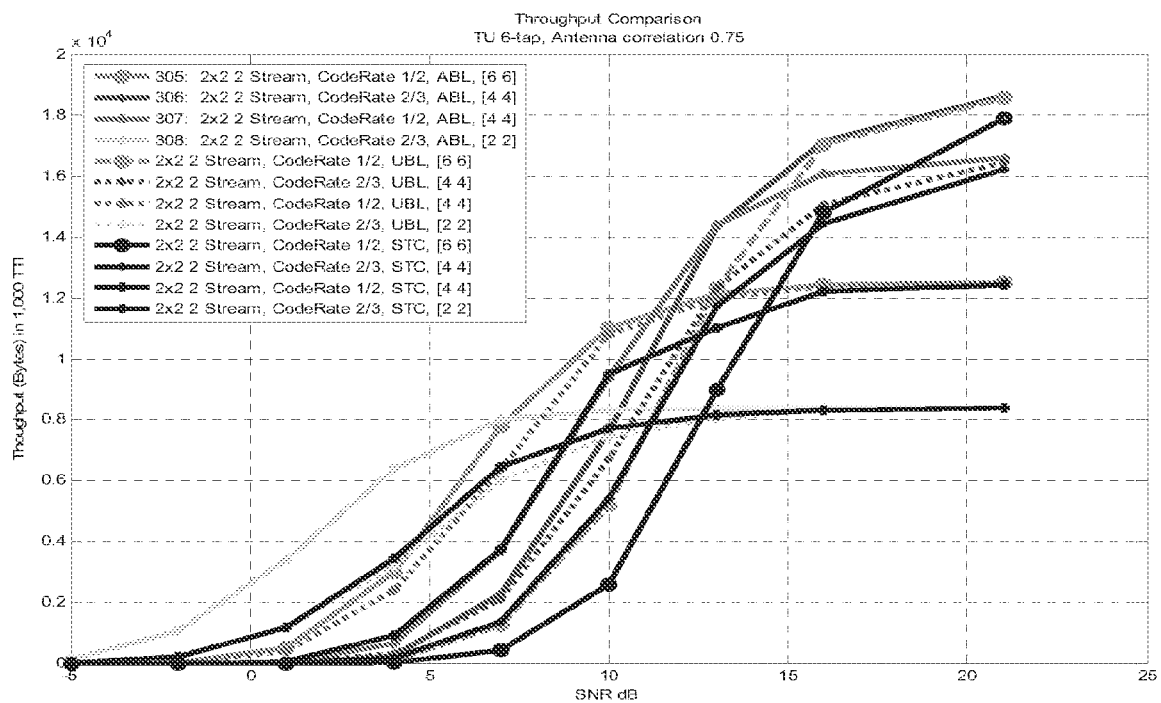
FIG. 4 depicts an example chart associated with throughput.

In general, FIG. 4 depicts an example of throughput of a MIMO system with hybrid automatic repeat request (H-ARQ), in accordance with various embodiments. Solid black curves are for open-loop. The other solid curves are for closed-loop with adaptive bit loading (ABL). Dashed curves are for closed-loop without adaptive bit loading, i.e. uniform bit loading (UBL). The numbers in the brackets is the number of bits loaded on the stream per subcarrier.

Figure 5:
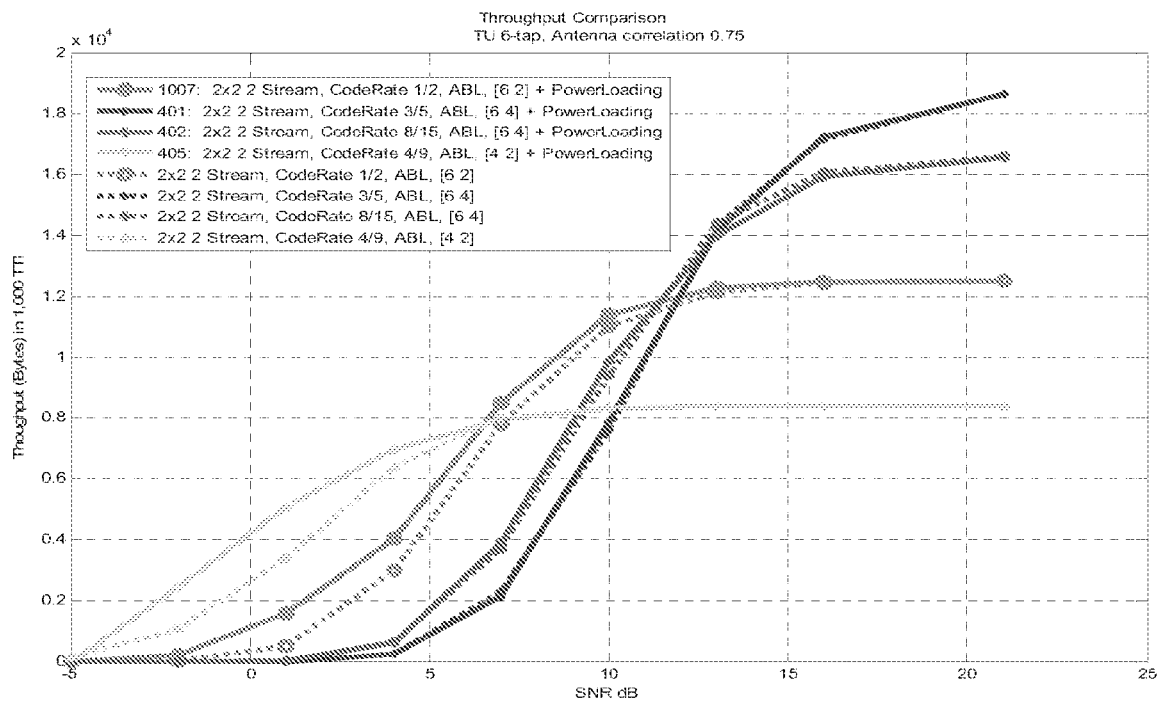
FIG. 5 depicts another example chart associated with throughput.

In general, FIG. 5 depicts another example of throughput of a MIMO system with H-ARQ, in accordance with various embodiments. Solid curves are for closed-loop with adaptive bit loading (ABL) and adaptive power loading. Dashed curves are for closed-loop with adaptive bit loading, but without adaptive power loading. The numbers in the brackets is the number of bits loaded on the stream per subcarrier.

Adaptive bit loading and adaptive power loading (or power water filling) across beamformed spatial channels may improve the performance of MIMO systems as shown in FIGS. 4 and 5. The bit and power loadings may be determined by the channel gains of the channels and the noise plus interference level on each channel. In singular value decomposition (SVD) beamformed MIMO, the interference across spatial channels is generally mitigated and may be ignored. The thermal noise level may be estimated using the KTB equation (where K is Boltzman's constant, T is temperature in Kelvin and B is signal bandwidth in Hz) and noise figure, e.g. 1-5 dB. The gain of each channel (or equivalently signal to noise plus interference ratio (SINR)) usually requires feedback. However, the feedback channel is generally costly in WMAN. Thus, it is desirable to reduce the feedback overhead. In a time division duplex (TDD) system, the feedback channel is generally reciprocal between downlink and uplink. A base station may use the uplink traffic or channel training to estimate the downlink channel. This saves the channel feedback. However, the channel reciprocity doesn't exist for a frequency division duplex (FDD) system.

Figure 6:
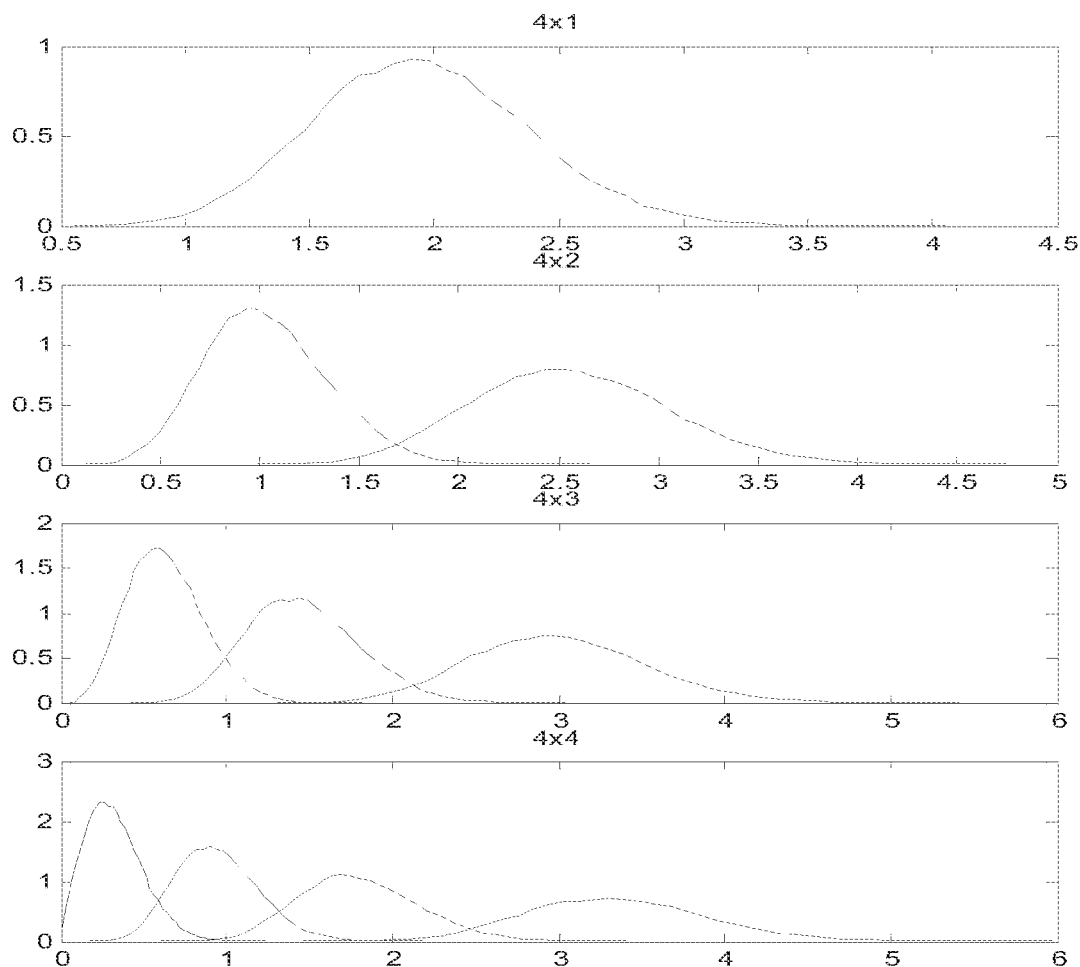
FIG. 6 depicts an example chart associated with probability density functions (PDFs)

In general, FIG. 6 depicts PDFs of the singular values of MIMO channel matrix with 4×1, 4×2, 4×3, and 4×4 antenna configurations for IEEE 802.11n model B LOS (Line Of Sight).

In accordance with various embodiments of the present invention, although the channel matrix of MIMO is generally random, the singular values of the channel matrix, i.e. the gains of the beamformed channels, generally have narrower probability density functions (PDFs) than that of the channel matrix entry. The PDF gets narrower as the number of antennas increases, as may be seen in FIG. 6. The narrower the PDF, the more easily the random variable may be estimated. The stronger singular value generally has a narrower PDF than that of the weaker singular value. The strong singular values usually correspond to usable spatial channels. In other words, the singular values are easier to estimate than the matrix entry and the gain of usable channel is easier to estimate than the unusable channel. Furthermore, the correlation between antennas also narrows the PDF of the singular value, and makes the estimation relatively easier. Because the channel statistics (e.g. power level of channel matrix entry and antenna correlation) are the same or likely to be the same for uplink and downlink, the base station may use the mean of singular value in the uplink as the estimation of the instantaneous singular value in the downlink. The mean may be computed over frequency and/or time. In accordance with various embodiments, after the channel gain of the beamformed channel is estimated, the base station may select the usable channels to send data and may determine the modulation and power level for the selected channel. The performance of such a scheme, in accordance with various embodiments, is illustrated in FIGS. 4 and 5.

In accordance with various embodiments of the present invention, the estimation of noise plus interference level may be improved by the conventional channel quality (CQI) feedback. CQI feed back is commonly used in 3G and WiMAX. The collection of channel samples, which are used to estimate the mean, should follow the operation in the system. In accordance with various embodiments, when multi-user diversity is employed in an orthogonal frequency division multiple access (OFDMA) system, a subscriber station sorts the channel quality across frequency (and time) and requests that a base station uses the best channels to send data. For example, the whole frequency band is partitioned into chunks of contiguous subcarriers, and the subscriber station feeds back the indexes for the best three chunks and their beamforming matrixes. In accordance with various embodiments, the base station may use some of the fed back chunks to send data. Since the fed back channel is sorted, the base station may also sort the uplink channels with the same parameters, e.g. chunk size and the total bandwidth. The estimation may then be conducted on the sorted channel samples. In sum, the collection of the matrix samples in the base station from the uplink should be as close as possible to the matrix finally used in the downlink. The collected matrix may be transposed before use. The transpose reflects the asymmetry between downlink and uplink channels.

In accordance with various embodiments of the present invention, the idea of using the uplink channel to estimate downlink channel parameters may be extended for non-beamformed MIMO. For example, the per antenna rate control (PARC) mode may not employ transmit beamforming, but it may employ bit (and power) loading on each transmit antenna. In a conventional PARC mode, it requires the subscriber station to feed back the channel quality of each data stream or bit loading information for each transmit antenna, where one transmit antenna sends one data stream. In a modified PARC mode, a data stream may be sent by a spatial channel formed by multiple transmit antennas. The demodulation scheme is usually minimum mean-square error (MMSE) plus successive cancellation. If the demodulation scheme is known at the base station, the base station may collect channel matrixes in the uplink with the same or similar statistics as those used in the downlink for PARC, and it may estimate the channel quality of each data stream seen at the receiver using the same demodulation scheme. After the estimation is completed, the base station may decide how many streams are used and what the modulation and coding scheme for each stream should be. Although the estimation is generally not accurate, it still provides information about the instantaneous, random downlink channel. This may reduce the feedback overhead needed from the subscriber station. For example, the subscriber station may only need to provide differential information to refine the estimation using the mean.

In addition to PARC mode, the idea may be used by open loop modes, in accordance with various embodiments. For example, the base station may estimate the channel quality from the uplink to decide the number of data streams and modulation/coding scheme for the downlink. The number of data streams is generally dependent on the antenna correlations and SINR of each stream. SINR is generally dependent on received signal power (or path loss) and demodulation scheme. Once the demodulation scheme is known or estimated, the SINR may be estimated using the uplink channel samples. After the SINR is estimated, the number of usable streams and the modulation, coding scheme, and power level of the streams may be determined.

In addition to the mean of channel quality or singular value, other statistics such as, for example, variance may also be useful and may be estimated, in accordance with various embodiments. The information may be used to set margin for the selected power and bit loading. For example, a base station may use a lower bit loading scheme on the selected channel than that computed from the mean because the variance is large and the estimation is not reliable. There may be multiple ways to compute the mean, e.g.

$$\bar{x} = \frac{1}{N}\sum_{i=1}^{N} |x_i|, \text{ or } \bar{x} = \sqrt{\frac{1}{N}\sum_{i=1}^{N} \|x_i\|^2}.$$

Once the number of usable channels K is estimated, the base station may dynamically ask a subscriber station to feed back information (such as beamforming matrix or SINR) only for the strongest K channels instead of all channels, in accordance with various embodiments of the present invention. This generally reduces the feedback overhead of (closed-loop) MIMO. In addition, putting transmission power in the strongest few channels instead of all channels may significantly improve performance in low SNR region. This may be seen in FIG. 7. Therefore, the selection of the channel number is an important application of the estimation by itself.

In accordance with various embodiments, the estimation from the uplink for the subscriber stations may also help the base station to schedule the downlink transmission. For example, the base station may pick subscriber stations with good channel quality to serve first and wait for the poor ones to change to be good (e.g. move out from a shadow fading). This type of scheduling is generally referred to as multiuser diversity. The uplink estimation may facilitate multiuser diversity scheduling.

Figure 7:
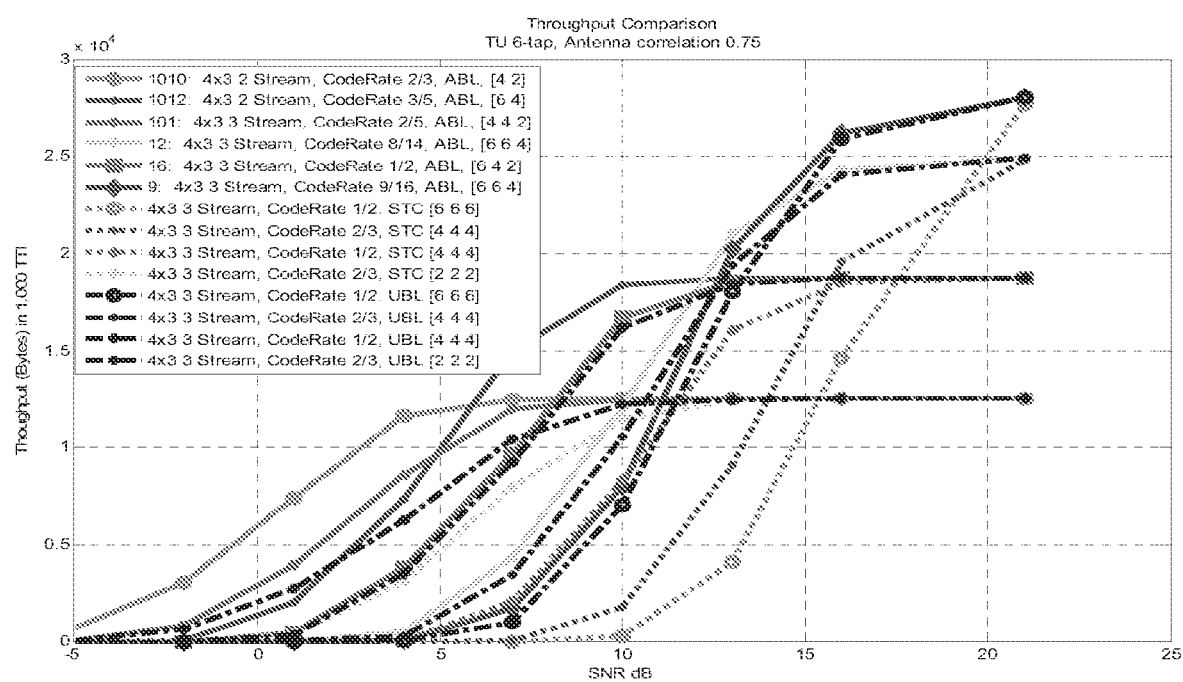
FIG. 7 depicts yet another example chart associated with throughput.

In general, FIG. 7 illustrates rank control that determines the number of usable channels, in accordance with various embodiments. The curves in legend 1 and 3 have the same maximum throughput while they use two and three channels respectively. Legend 1 performs better than legend 3. Similarly, legend 2 outperforms legend 4.

Exemplary pseudo code, in accordance with various embodiments of the present invention, may be as follows:

1. Base station collects uplink channels according the mode used in the downlink. The collected channels are transposed and treated as channels collected from the downlink;
2. Compute the mean and variance of the channel quality for each spatial channel or data stream;
3. Determine the number of usable streams or spatial channels, bit loading, power loading, and coding scheme on the usable channels or streams jointly;
4. Select subscriber station(s) to which to transmit; and
5. Conduct downlink transmission using determined parameters.

At a subscriber station, it generally needs to know the power of each power loaded channel for demodulation, in accordance with various embodiments. The base station may signal the power loading to a subscriber station using channel training symbols. The training symbols may be dedicated to the user in OFDMA system. Because the loading generally is on the dedicated pilots, it doesn't affect the channel estimation of other users. The dedicated pilot may be sent over the beamformed spatial channel. In addition to dedicated pilot, the power level may be specified in a control channel or a broadcast channel so that the receiver knows about the power level difference between the power loaded data symbol and the channel training symbols (e.g. pilots) that are not power loaded.

Figure 8:
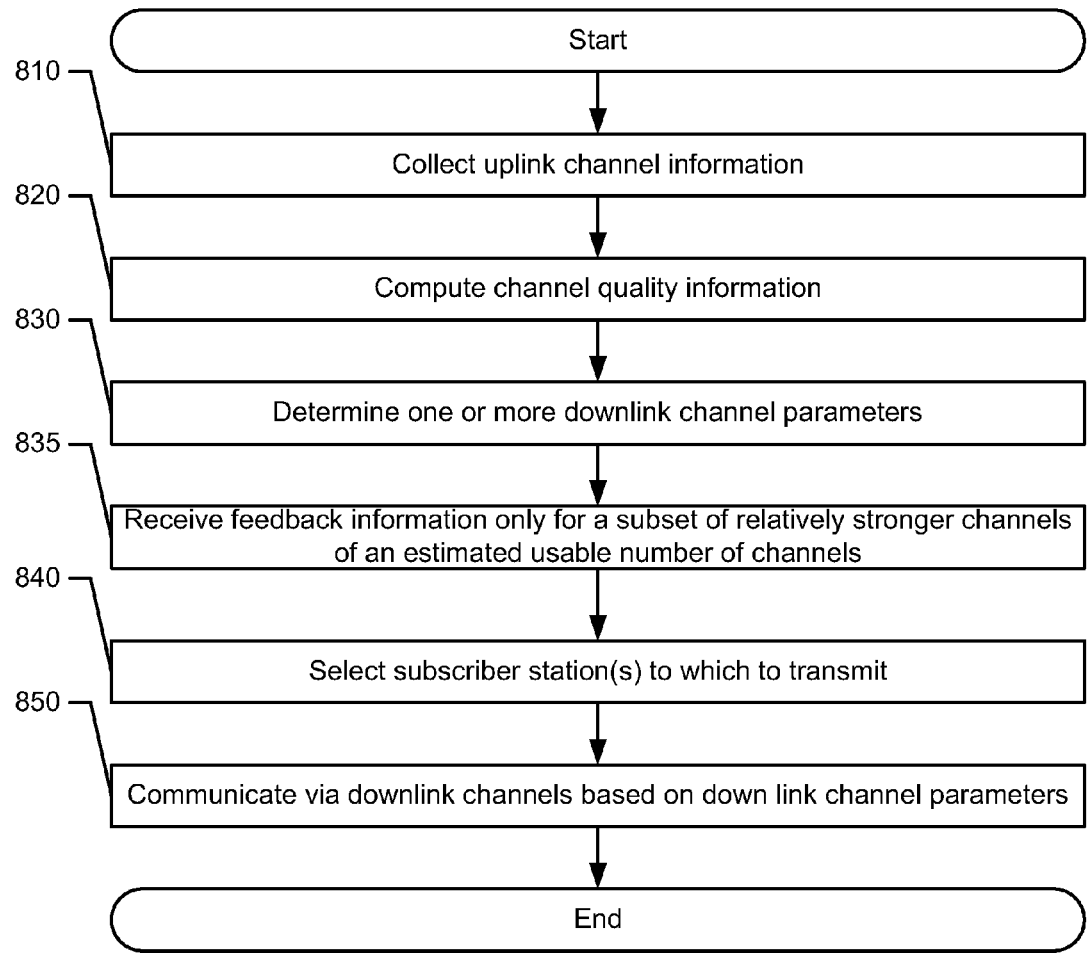
FIG. 8 is a flow diagram representation of one manner in which the example base station of FIG. 3 may be configured.

In accordance with various embodiments of the present invention, FIG. 8 depicts one manner in which base station 300 may be configured to provide a power loading and modulation selection system. The example process 800 of FIG. 8 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 8, these actions may be performed in other temporal sequences. Again, the example process 800 is merely provided and described in conjunction with the system and apparatus of FIGS. 2 and 3 as an example of one way to provide a power loading and modulation selection system.

In the example of FIG. 8, the process 800 may begin with base station 300 (FIG. 3) collecting uplink channel information according to the mode used in the downlink (block 810). Based at least in part on the collected uplink channel information, the base station 300 may compute channel quality information of each spatial channel and/or data stream (block 820). For example, the base station may compute the mean and/or the variance of the channel quality for each spatial channel and/or data stream. The channel quality information may be computed by estimating a usable number of channels. Based at least in part on the channel quality information, the base station 300 may determine one or more downlink channel parameters (block 830). Downlink channel parameters may include the number of usable data streams, the number of usable spatial channels, bit loading, power loading, coding scheme, and/or other suitable parameters. The base station 300 may receive feedback information only for a subset of relatively stronger channels of the estimated usable channels (block 835). The base station 300 may select one or more subscriber stations to which to transmit (block 840) based at least in part on one or more downlink channel parameters. Accordingly, the base station 300 may communicate with one or more subscriber stations (e.g., the subscriber stations 220 and/or 225) based on the downlink channel parameters (block 850). The methods and apparatus described herein are not limited in this regard.

In general, the methods and apparatus described herein may use uplink channel to estimate parameters in the downlink channel. It reduces the feedback overhead for power and bit loading in MIMO system. The methods and apparatus described herein are not limited in this regard.

Although the methods and apparatus described herein may be associated with the Third Generation Partnership Project (3GPP) for the Long Term Evolution (LTE), the methods and apparatus described herein may be readily applicable with other suitable wireless technologies, protocols, and/or standards. The methods and apparatus described herein are not limited in this regard.

Figure 9:
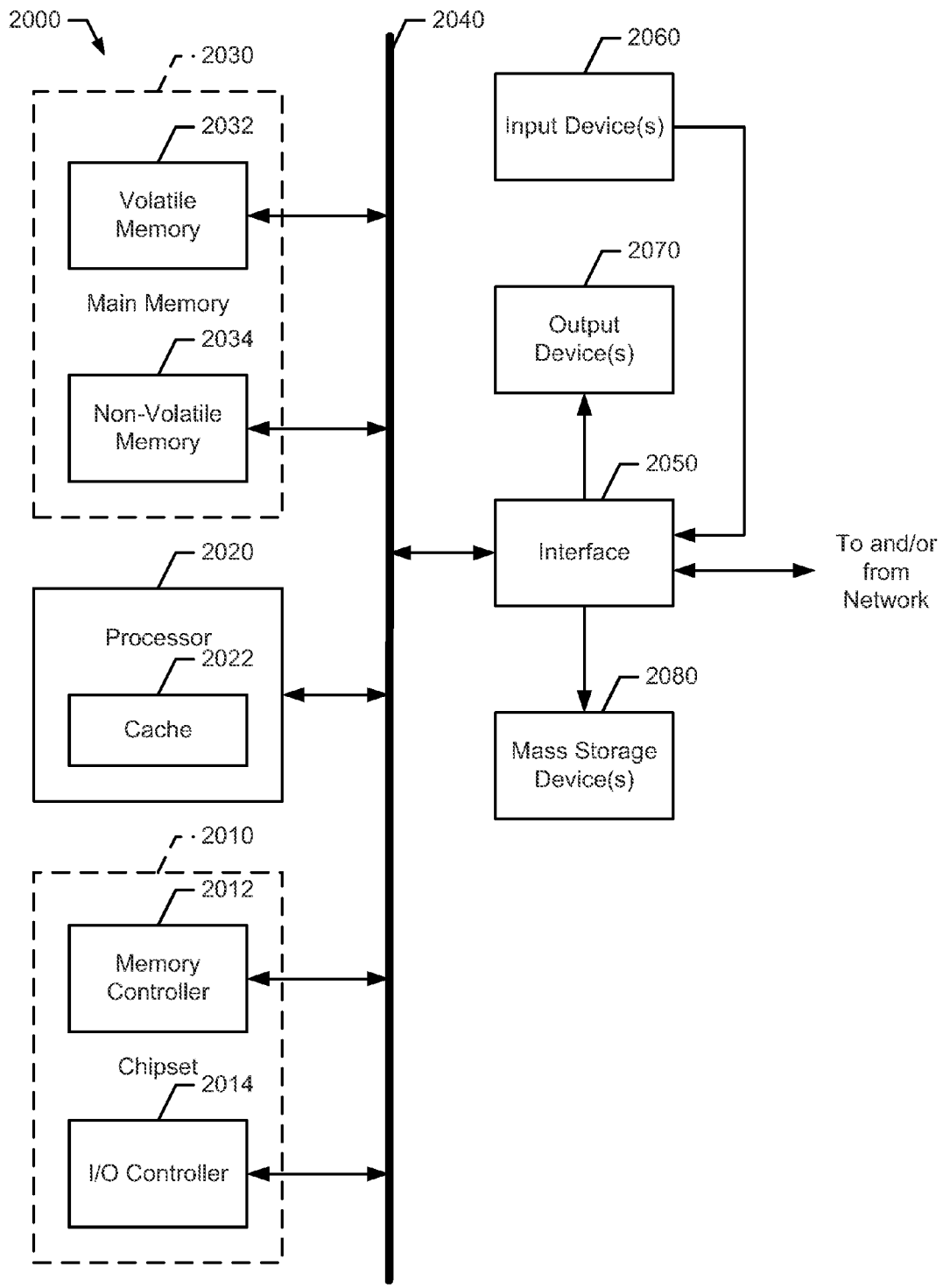
FIG. 9 is a block diagram representation of an example processor system that may be used to implement the example base station of FIG. 3.

FIG. 9 is a block diagram of an example processor system 2000 adapted to implement methods and apparatus disclosed herein. The processor system 2000 may be a desktop computer, a laptop computer, a handheld computer, a tablet computer, a PDA, a server, an Internet appliance, a base station, an access point and/or any other type of computing device.

The processor system 2000 illustrated in FIG. 9 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. In various embodiments, I/O controller 2014 of chipset 2010 may be endowed with all or portions of the teachings of the present invention described above. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface. In various embodiments, interface circuit 2050 may be endowed with all or portions of the teachings of the present invention described above.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   collecting, by a transmitter station, information associated with one or more uplink channels of a multiple-input-multiple-output (MIMO) system employed to communicate with at least one receiver station, wherein the collecting information comprises collecting channel quality for spatial channels and/or data streams;
   based at least in part on the information associated with the one or more uplink channels, computing channel quality information for a number of downlink channels by estimating a usable number of channels;
   based at least in part on the computing channel quality information, determining one or more downlink channel parameters for use by the transmitter station to transmit signals to the at least one receiver station via one or more of the downlink channels; and
   receiving by the transmitter station, from the at least one receiver station, feedback information only for a subset of relatively stronger channels of the estimated usable channels.

2. The method in accordance with claim 1, further comprising the transmitter station selecting at least one receiver station to which to transmit and communicating with the selected at least one receiver station via the one or more downlink channels based on the downlink channel parameters.

3. The method in accordance with claim 1, wherein determining the one or more downlink channel parameters comprises determining at least one of a number of data streams, one or more modulation/coding schemes, bit loading or power loading for the data streams.

4. The method in accordance with claim 1, wherein the feedback information comprises at least one of a beamforming matrix or signal to noise plus interference ratio (SINR).

5. An apparatus comprising:
   a receiver block configured to collect information associated with one or more uplink channels of a multiple-input-multiple-output (MIMO) system employed by a transmitter station hosting the apparatus to communicate with a receiver station, wherein the information is collected by collecting channel quality for spatial channels and/or data streams; and
   a computation block coupled to the receiver block, and configured to compute, based at least in part on the information associated with the one or more uplink channels, channel quality information for a number of downlink channels by estimating a usable number of channels, and determine, based at least in part on the channel quality information, one or more downlink channel parameters for use by the transmitter station to communicate with the receiver station via the one or more downlink channels;
   wherein the receiver block is further configured to receive feedback information only for a subset of relatively stronger channels of the estimated usable channels.

6. The apparatus in accordance with claim 5, further comprising a transmit block coupled to the computation block and configured to communicate with the receiver station via the one or more downlink channels based on the downlink channel parameters.

7. The apparatus in accordance with claim 6, wherein the transmit block and the receive block are part of a transceiver having at least one common component, and the apparatus is a chipset.

8. The apparatus in accordance with claim 5, wherein the computation block is configured to determine at least one or a number of data streams, one or more modulation/coding schemes, bit loading or power loading for the data streams.

9. The apparatus in accordance with claim 5, wherein the feedback information comprises at least one of a beamforming matrix or signal to noise plus interference ratio (SINR).

10. An article of manufacture comprising:
    a storage medium; and
    a set of instructions stored in the storage medium, which when executed by a processor causes the processor to perform operations comprising
    collect information associated with one or more uplink channels of a multiple-input-multiple-output (MIMO) system employed by a base station to communicate with a subscriber station, wherein the information is collected by collecting channel quality for spatial channels and/or data streams;
    based at least in part on the information associated with the one or more uplink channels, compute channel quality information for a number of downlink channels by estimating a usable number of channels;
    based at least in part on the channel quality information, determine one or more downlink channel parameters for use by the base station to communicate with the subscriber station via the one or more downlink channels; and
    receive by the base station, from the subscriber station, feedback information only for a subset of relatively stronger channels of the estimated usable channels.

11. The article of manufacture in accordance with claim 10, wherein the instructions, when executed, further cause the processor to select at least one subscriber station to which to transmit and to provide the downlink channel parameters to a transceiver of the base station for use to communicate with the subscriber station via the one or more downlink channels based on the downlink channel parameters.

12. A system comprising:
    an omnidirectional antenna; and
    an apparatus coupled to the omnidirectional antenna, comprising:
    a receiver block configured to collect information associated with one or more uplink channels of a multiple-input-multiple-output (MIMO) system employed by the system to communicate with another system, wherein the information is collected by collecting channel quality for spatial channels and/or data streams; and
    a computation block coupled to the receiver block, and configured to compute, based at least in part on the information associated with the one or more uplink channels, channel quality information for a number of downlink channels by estimating a usable number of channels, and determine, based at least in part on the channel quality information, one or more downlink channel parameters for use by the system to communicate with the other system over the downlink channels;

wherein the receiver block is further configured to receive feedback information only for a subset of relatively stronger channels of the estimated usable channels.

13. The system in accordance with claim 12, wherein the apparatus further comprises a transmit block coupled to the computation block and configured to facilitate the system to communicate with the other system via the one or more downlink channels based on the downlink channel parameters.

14. The system in accordance with claim 13, wherein the transmit block and the receive block are part of a transceiver having at least one common component.

15. The system in accordance with claim 12, wherein the computation block is configured to determine a number of data streams and one or more modulation/coding schemes for the data streams.

16. The system in accordance with claim 12, wherein the feedback information comprises at least one of a beamforming matrix or signal to noise plus interference ratio (SINR).

* * * * *